(12) United States Patent
Nakamura

(10) Patent No.: US 6,630,636 B2
(45) Date of Patent: Oct. 7, 2003

(54) INHIBITOR SWITCH

(75) Inventor: Shinya Nakamura, Tokyo (JP)

(73) Assignee: Niles Parts Co., Ltd., Tokyo (JP)

( * ) Notice: Subject to any disclaimer, the term of this patent is extended or adjusted under 35 U.S.C. 154(b) by 0 days.

(21) Appl. No.: 10/002,182

(22) Filed: Dec. 5, 2001

(65) Prior Publication Data

US 2002/0092740 A1 Jul. 18, 2002

(30) Foreign Application Priority Data

Dec. 6, 2000 (JP) .................................... P2000-372076

(51) Int. Cl.[7] .............................................. H01H 21/54
(52) U.S. Cl. ................... 200/16 R; 200/252; 200/537; 200/550
(58) Field of Search ........................... 200/16 R, 16 A, 200/252, 257, 260, 537, 547, 549, 550, 16 C, 253, 561

(56) References Cited

U.S. PATENT DOCUMENTS

| | | | | |
|---|---|---|---|---|
| 3,745,270 A | * | 7/1973 | Granitz ..................... 200/16 C |
| 4,370,529 A | * | 1/1983 | Loose ....................... 200/16 D |
| 5,598,917 A | * | 2/1997 | Thomas ..................... 200/548 |
| 5,667,062 A | * | 9/1997 | Yasufuku et al. ........... 200/536 |
| 5,875,884 A | | 3/1999 | Tomotoshi |
| 5,898,142 A | * | 4/1999 | Ohtaki et al. ............. 200/16 C |
| 5,945,647 A | * | 8/1999 | Hoskins ....................... 200/18 |
| 6,046,413 A | * | 4/2000 | Simonis et al. ........... 200/11 EA |

FOREIGN PATENT DOCUMENTS

JP          10-134672          5/1998

* cited by examiner

Primary Examiner—Lincoln Donovan
Assistant Examiner—K. Lee
(74) Attorney, Agent, or Firm—Rader, Fishman & Grauer PLLC; Ronald P. Kananen, Esq.

(57) ABSTRACT

To enable to provide an inhibitor switch capable of maintaining an accurate ON/OFF state for a long period of time regardless of wear of a moving contact and having high durability. The inhibitor switch includes a fixed contact and a moving contact; a base disk is projected with insulator portions formed by insulating members in correspondence with an ON/OFF switch position of the fixed contact constituting a boundary of contact and non-contact of the moving contact relative to the fixed contact; the moving contact is provided with a ride-on portion capable of riding on the insulator portion when the moving contact is slidingly moved relative to the fixed contact and the moving contact is disposed at the ON/OFF switch position of the fixed contact; the ride-on portion rides on the insulator portion; the moving contact is separated from and brought into non-contact with the fixed contact; and when the ride-on portion comes down from the insulator portion, the moving contact is brought into contact with the ON/OFF switch position of the fixed contact.

10 Claims, 14 Drawing Sheets

Fig.15

|       | VB | S1 | S2 | S3 | S4 |
|-------|----|----|----|----|----|
| P-ST  | ○  |    |    |    |    |
| P     | ○  |    |    | ○  |    |
| P-R   | ○  |    |    | ○  | ○  |
| R     | ○  | ○  |    | ○  | ○  |
| N-R   | ○  | ○  |    | ○  |    |
| N-ST  | ○  | ○  |    |    |    |
| N-D   | ○  | ○  |    |    | ○  |
| D     | ○  | ○  | ○  |    | ○  |
| 3     | ○  |    | ○  |    | ○  |
| 2     | ○  |    | ○  | ○  | ○  |
| 1     | ○  |    | ○  | ○  |    |

(a)

(b)

INHIBITOR SWITCH

BACKGROUND OF THE INVENTION

1. Field of the Invention

The present invention relates to an inhibitor switch.

2. Description of the Related Art

There is a conventional inhibitor switch apparatus described in, for example, Japanese Patent Laid-Open No. 134672/1998 as shown by FIG. 16. The inhibitor switch 201 is provided with a plurality of fixed contacts 205 at a lower face of a pole disk 203 and a moving contact 209 is supported by a moving disk 207 movable relative to the pole disk 203. The moving contact 209 is provided with a plurality of contact arms 211 in a cantilever style. The respective contact arm 211 is brought into slidable contact with the respective fixed contact 205. A state of contact to the respective fixed contact 205 by the respective contact arm 211 is as shown by, for example, FIG. 17.

The respective fixed contact 205 is provided to the pole disk 203 formed by resin by insert molding and a bent contact portion 213 of the contact arm 211 is made slidable relative to the fixed contact 205. Further, an ON/OFF switch position 215 by slidable movement of the moving contact 211 relative to the fixed contact 205, constitutes a boundary of insert molding of the fixed contact 205 and the pole disk 203.

Therefore, in accordance with movement of the moving disk 207, the respective contact arm 211 is slidingly moved relative to the respective fixed contact 205 while in contact therewith, contact/non-contact of the contact arm 211 with respect to the fixed contact 205, is carried out by passing the ON/OFF switch position 215 and selective conduction of the respective fixed contact 205 can be ensured.

In this case, the contact portion 213 of the contact arm 211 is formed to bend and is brought into a substantially linear contact state relative to the fixed contact 205. Therefore, by determining the ON/OFF switch position 215 by accurately setting the boundary of the insert molding, switching between contact/non-contact of the respective contact arm 211 with respect to the respective fixed contact 205, can accurately be carried out.

However, the contact arm 211 is slidingly moved relative to the fixed contact 205 as described above and therefore, there poses a problem that the contact portion 213 of the contact arm 211 is ageingly worn and is brought into a face contact state as shown by FIG. 18. Moreover, an ON/OFF switch range H is enlarged, a time period during which the contact portion 213 rides on the ON/OFF switch position 115 is prolonged and hysteresis of a circuit is increased.

Particularly, in the case of an inhibitor switch used in a transmission case, oil is scattered and worn powder of an insulator or the like mixed into the oil is liable to be put between the contact portion 213 of the contact arm 211 and the fixed contact 205 and there is a concern that wear is progressed at an early stage such that the ON/OFF switch range H is increased at an early stage.

Further, there also poses a problem that the ON/OFF switch position 115 is extremely difficult to adjust on dies. That is, according to the above-described structure, when the ON/OFF switch position 115 is adjusted, an end portion of the fixed contact 205 is machined by, for example, 1/100 mm, dies for insert molding must be adjusted in conformity therewith. Accordingly, both dies of the pole disk 203 and the fixed contact 205 need to change and there is a concern that it is extremely difficult to determine the ON/OFF switch position 115 by adjusting them both.

Further, in press-forming the fixed contact 205, droop 219 is caused as shown by FIG. 19A and burr 221 is caused as shown by FIG. 19B. Accordingly, when the ON/OFF switch position 115 is determined, an actual ON/OFF switch position 223 or 225 is shifted from the above-described ON/OFF switch position 115 by the droop 219 or the burr 221 and there poses a problem that it is extremely difficult to accurately adjust the ON/OFF switch position also in this respect.

SUMMARY OF THE INVENTION

The invention is aimed to provide an inhibitor switch apparatus capable of accurately maintaining an ON/OFF switch position and facilitating adjustment of the ON/OFF switch position even when wear is caused at a moving contact.

According to a first aspect of the invention, there is provided an inhibitor switch comprising a pole disk having a fixed contact, and a moving disk having a moving contact slidable relative to the fixed contact and movable relative to the pole disk, the inhibitor switch being arranged in a transmission case of an automatic transmission, with a speed change position of the automatic transmission being detected by the moving contact and the fixed contact, wherein the pole disk is projected with an insulator portion formed by an insulating member in correspondence with an ON/OFF switch position of the fixed contact constituting a boundary of contact and non-contact by sliding movement of the moving contact relative to the fixed contact; the moving contact includes a ride-on portion capable of riding on the insulator portion; and when the moving contact is slidingly moved relative to the fixed contact and the moving contact is disposed at the ON/OFF switch position of the fixed contact, the ride-on portion rides on the insulator portion, the moving contact is separated from and brought into non-contact with the fixed contact and when the ride-on portion comes down from the insulator portion, the moving contact is brought into contact with the ON/OFF switch position of the fixed contact.

According to a second aspect of the invention, there is provided the inhibitor switch according to the first aspect of the invention, wherein the ride-on portion of the moving contact includes a rounded portion for riding on; and the insulator portion includes a sliding face for making the rounded portion of the ride-on portion ride thereon and guiding the rounded portion.

According to a third aspect of the invention, there is provided the inhibitor switch according to the first or second aspect of the invention, wherein the moving contact includes a pair of contact portions in a cantilever shape simultaneously brought into elastic contact with the fixed contact; and the ride-on portion is arranged between the two contact portions and formed in a cantilever shape shorter than the contact portions.

According to a fourth aspect of the invention, there is provided the inhibitor switch according to the first or second aspect of the invention, wherein the moving contact includes a plurality of contact portions simultaneously brought into elastic contact with the fixed contact; and the fixed contact includes discharge portions for discharging a foreign object interposed between the two contacts from discharge ports provided at the fixed contact respectively in correspondence with the contact portions of the moving contact.

According to a fifth aspect of the invention, there is provided the inhibitor switch according to the fourth aspect of the invention, wherein the respective discharge portions in correspondence with the respective contact portions are arranged at positions shifted from each other in a sliding direction of the movable contact.

According to a sixth aspect of the invention, there is provided the inhibitor switch according to the fourth or fifth aspect of the invention, wherein the discharge portions are provided at vicinities of the ON/OFF switch position of the fixed contact.

According to a seventh aspect of the invention, there is provided the inhibitor switch according to any one of the fourth to sixth aspects of the invention, wherein the discharge port communicates with a through hole of the base disk.

According to the first aspect of the invention, in the inhibitor switch apparatus comprising the pole disk having the fixed contact and the moving disk having the moving contact slidable relative to the fixed contact and movable relative to the base disk, wherein the inhibitor switch apparatus is arranged in the transmission case of the automatic transmission and the speed change position of the automatic transmission is detected by the moving contact and the fixed contact, by projecting the insulator portion formed by the insulating member in correspondence with the ON/OFF switch position of the fixed contact constituting the boundary of contact and non-contact of the moving contact relative to the fixed contact, to the pole disk and providing the ride-on portion capable of riding on the insulator portion, at the moving contact, when the moving contact is slidingly moved relative to the fixed contact and the moving contact is disposed at the ON/OFF switch position of the fixed contact, it is possible that the ride-on portion rides on the insulator portion, the moving contact is separated from and brought into non-contact with the fixed contact and when the ride-on portion comes down from the insulator portion, the moving contact is brought into contact with the ON/OFF switch position of the fixed contact.

Therefore, by making the ride-on portion of the moving contact ride on the insulator portion or come down from the insulator portion, contact and non-contact of the moving contact relative to the fixed contact can firmly be carried out at the ON/OFF switch position of the fixed contact. That is, even when the moving contact is worn and contact to the fixed contact is spread from line contact to face contact, by making the ride-on portion of the moving contact ride on the insulator portion or come down from the insulator portion, the moving contact can make either non-contact or contact firmly at the ON/OFF switch position of the fixed contact. Therefore, an accurate inhibitor switch capable of maintaining detection of the accurate speed change position for a long period of time and having high durability can be provided.

According to the second aspect of the invention, in addition to an effect of the invention of the first aspect, the ride-on portion of the moving contact includes the rounded portion for riding on, the insulator portion includes the sliding face for making the rounded portion of the ride-on portion ride thereon and for guiding the rounded portion. Therefore, when the ride-on portion of the moving contact rides on the insulator portion, the rounded portion is not slidingly moved at one location of the insulator portion but slidingly moved along the sliding face of the insulator portion and the insulator portion can be prevented from being worn locally. Therefore, by making the ride-on portion ride on the insulator portion or come down from the insulator portions, the moving contact can firmly make contact and non-contact at the ON/OFF switch position of the fixed contact and a firm ON/OFF state can be maintained for a long period of time.

According to the third aspect of the invention, in addition to the effect of the invention of the first or second aspect, the moving contact includes the pair of contact portions in the cantilever shape simultaneously brought into elastic contact with the fixed contact. The ride-on portion is arranged between the two contact portions and formed in the cantilever shape shorter than the contact portions and accordingly, the rigidity of the ride-on portion can be ensured while bringing the moving contact into elastic contact with the fixed contact. When the ride-on portion rides on the insulator portion or comes down from the insulator portion, bending of the ride-on portion is restrained and contact and non-contact operation of the moving contact can firmly be carried out at the ON/OFF switch position of the fixed contact.

According to the fourth aspect of the invention, in addition to the effect of the invention of the first or second aspect, the moving contact includes the plurality of contact portions simultaneously brought into elastic contact with the fixed contact and includes the discharge portions for discharging the foreign object interposed between the two contacts from the discharge ports provided at the fixed contact respectively in correspondence with the contact portions of the moving contact and accordingly, when the moving contact comes down from the insulator portion, even when the foreign object is interposed between the moving contact and the fixed contact, by making the movable contact slidingly move relative to the fixed contact, the foreign object between the two contacts can be discharged from the discharge ports to the discharge portions. Therefore, contact of the moving contact to the fixed contact can firmly be ensured.

Further, since the moving contact includes the plurality of contact portions simultaneously brought into elastic contact with the fixed contact, even when the foreign object is interposed between either of the contact portions and the fixed contact, by utilizing elasticity of the moving contact, other contact portions can firmly be brought into contact with the fixed contact and regardless of whether a foreign object is interposed, contact of the moving contact to the fixed contact can firmly be ensured.

According to the fifth aspect of the invention, in addition to an effect of the invention of the fourth aspect, the respective discharge portions in correspondence with the respective contact portions are arranged at the positions shifted from each other in the direction of sliding the moving contact and therefore, even when the foreign object is interposed between either of the contact portions and the fixed contact, by discharging the foreign object by either of the discharge portions the positions of which are shifted from each other, contact between the contact portion and the fixed contact can be ensured. Therefore, the foreign objects can be restrained from being simultaneously interposed between both of the contact portions and the fixed contact and the contact portion and the fixed contact can firmly be brought into contact with each other.

According to the sixth aspect of the invention, in addition to the effect of the invention of the fourth or fifth aspect, the discharge portions are provided at vicinities of the ON/OFF switch position of the fixed contact and therefore, when the moving contact comes down from the insulator portion to the ON/OFF switch position of the fixed contact, even when the foreign object is interposed between the contact portion of the moving contact and the fixed contact, by starting to move the moving contact slidingly, the foreign object is immediately discharged from the discharge port and the moving contact can firmly be brought into contact with the fixed contact.

According to the seventh aspect of the invention, in addition to the effect of the invention of any one of the fourth to sixth aspects, the discharge port is communicated with the through hole of the base disk and therefore, the foreign object discharged from the discharge port to the discharge portion can be discharged from the through hole of the base disk to outside of the base disk and the foreign object can firmly be discharged.

BRIEF DESCRIPTION OF THE DRAWINGS

FIG. 15 is a diagram showing a relationship between conduction of fixed contacts and speed change positions;

DESCRIPTION OF THE PREFERRED EMBODIMENTS

Figure 1:
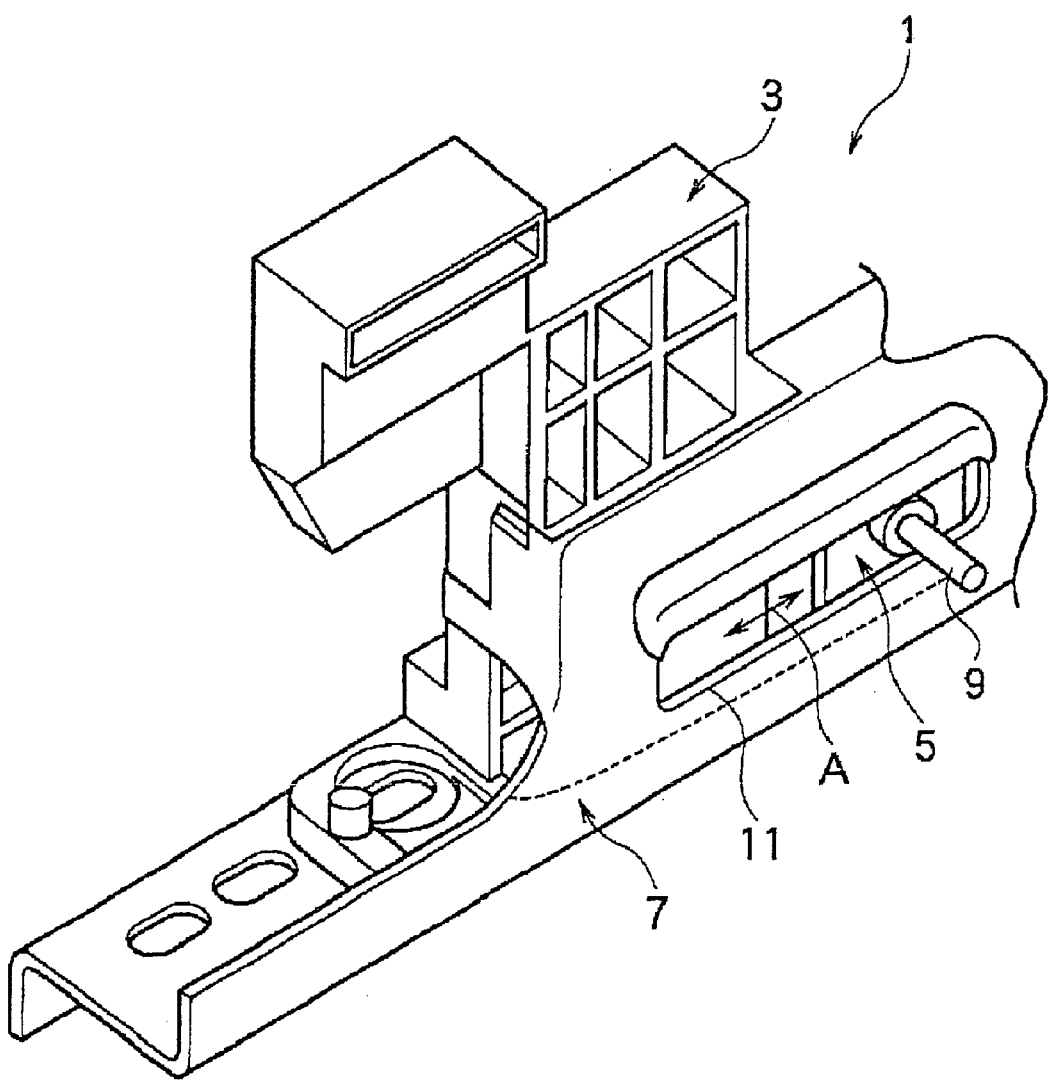
FIG. 1 is a perspective view of an inhibitor switch according to an embodiment of the invention.

FIG. 1 shows a perspective view of an inhibitor switch to which an embodiment of the invention is applied. The inhibitor switch 1 is arranged and attached inside of a transmission case of an automatic transmission, although not illustrated, in an erected state as shown by FIG. 1. Further, the inhibitor switch 1 is brought into a state of being splashed with oil at high temperature scattered inside of the transmission case. The inhibitor switch 1 is constituted generally by a pole disk 3, a moving disk 5 and a case 7 made of metal integral with a bracket.

The pole disk 3 is fixed by the case 7 by calking and the moving disk 5 is arranged between the case 7 and the pole disk 3 and is reciprocally movable in an arrow mark A direction relative to the pole disk 3.

The moving disk 5 is projected with a drive pin 9. The drive pin 9 is projected from a hole 11 of the case 7 which is prolonged in the arrow mark A direction. The drive pin 9 is connected to a cooperatively moving portion of a manual valve of the automatic transmission, although not illustrated. Further, by moving the moving disk 5 in the arrow mark A direction and stopping the moving disk 5 relative to the pole disk 3 in accordance with a speed change position of the manual valve, the speed change position by the manual valve can be detected.

Figure 2:
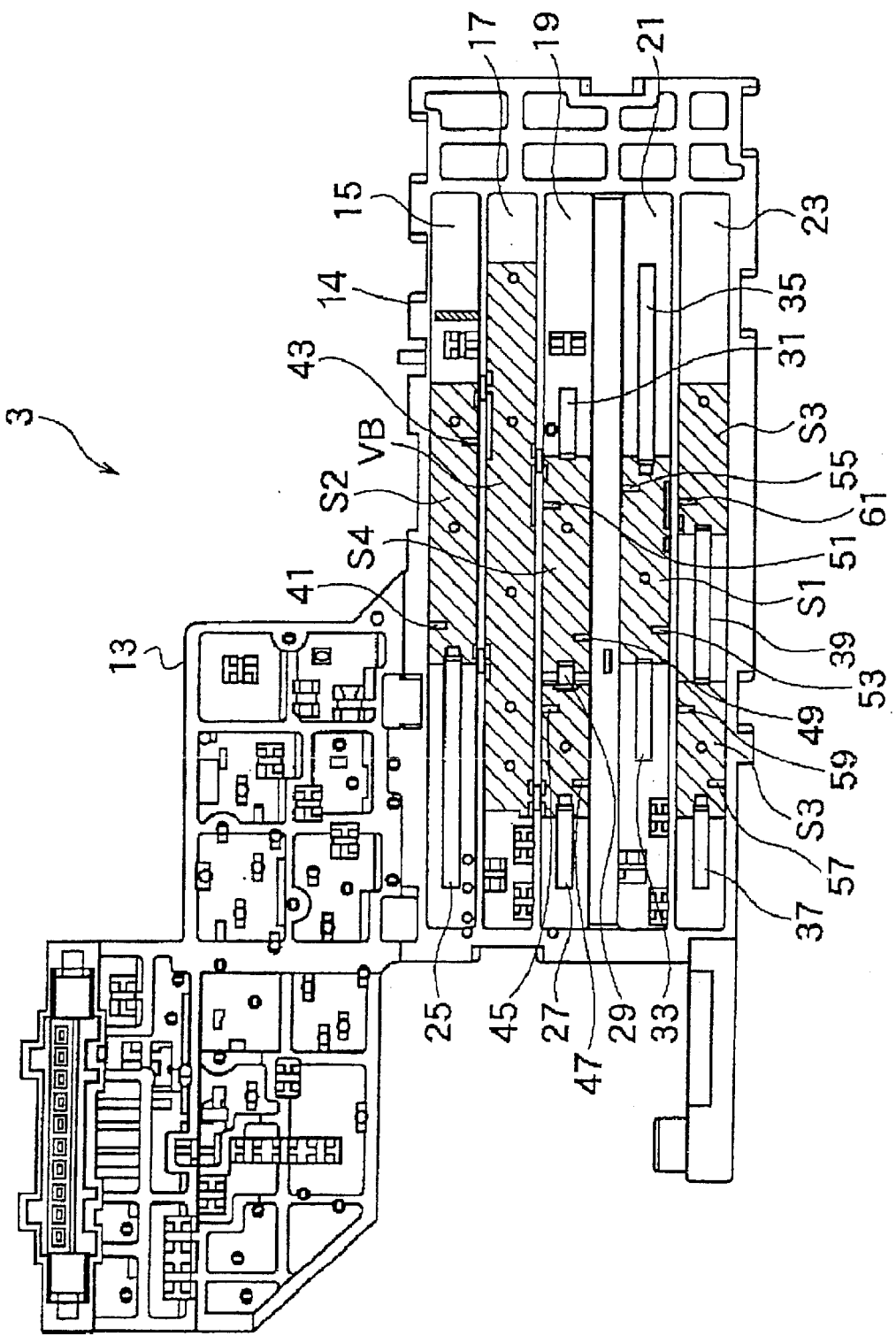
FIG. 2 is a front view of a pole disk according to the embodiment.

A structure of contacts of the pole disk 3 is as shown by FIG. 2. FIG. 2 shows a front view of the pole disk 3. A base disk 13 of the pole disk 3 is molded by resin and the base disk 13 is provided with a plurality of fixed contacts S2, VB, S4, S1, S3 at a vertical wall 14 opposed to the case 7. That is, a vertical wall 14 of the base disk 13 is provided with five pieces of grooves 15, 17, 19, 21 and 23 along the arrow mark A direction (FIG. 1). The respective grooves 15, 17, 19, 21 and 23 are formed in a shape recessed to a direction orthogonal to the paper face of FIG. 2 and the fixed contacts S2, VB, S4 and S1 and S3 in a flat plate shape are respectively fixed to faces of the respective grooves 15, 17, 19, 21 and 23 on the depth side.

The fixed contact VB is formed to be prolonged along the groove 17 to constitute a common contact brought into an always conductive state. The other fixed contacts S2, S4, S1 and S3 are respectively set to predetermined lengths for ON/OFF connection.

The base disk 13 is provided with insulator portions 25, 27, 29, 31, 33, 35, 37 and 39 in the respective grooves 15, 17, 19, 21 and 23. The insulator portions 25, 27, 29, 31, 33, 35, 37 and 39 are formed by insulating members in correspondence with ON/OFF switch positions of the fixed contacts constituting boundaries of contact/non-contact of moving contacts, mentioned later, with respect to the fixed contacts S2, S4, S1 and S3. According to the embodiment, the insulator portions are projected integrally with the faces on the depth sides of the respective grooves 15, 17, 19, 21 and 23. However, separate members of the insulator portions can also be fixed by adhesion or the like.

Further, according to the embodiment, there are provided discharge portions 41, 43, 45, 47, 49, 51, 53, 55, 57, 59 and 61 for discharging foreign objects. The discharge portion 41 and the discharge portion 43 of the fixed contact S2, the discharge portions 45 and 51 and the discharge portion 49 of the fixed contact S4, the discharge portion 53 and the discharge portion 55 of the fixed contact S1, and the discharge portions 59 and 61 and the discharge portions 57 of the fixed contact S3, are shifted from each other in positions thereof in sliding directions of the moving contacts and arranged in correspondence with the moving contacts in sliding ranges thereof.

The discharge portion 41 is arranged at a vicinity of the insulator portion 25 and is arranged contiguous to a vicinity of the ON/OFF switch position of the fixed contact S2 at which the moving contact coming down from the insulator portion 25 is brought into contact with the fixed contact S2. Therefore, there is constructed a constitution in which when the moving contact is slidingly moved from the ON/OFF switch position, the moving contact immediately passes above the discharge portion 41.

Similarly, the discharge portions 45 and 49 are arranged at a vicinity of the insulator portion 29, the discharge portion 47 is arranged at a vicinity of the insulator portion 27, the discharge portion 51 is arranged at a vicinity of the insulator portion 31, the discharge portion 53 is arranged at a vicinity of the insulator portion 33, the discharge portion 55 is arranged at a vicinity of the insulator portion 35, the discharge portion 57 is arranged at a vicinity of the insulator portion 37 and the discharge portions 59 and 61 are arranged at a vicinity of the insulator portion 39, respectively, by similar constitutions.

Figure 3:
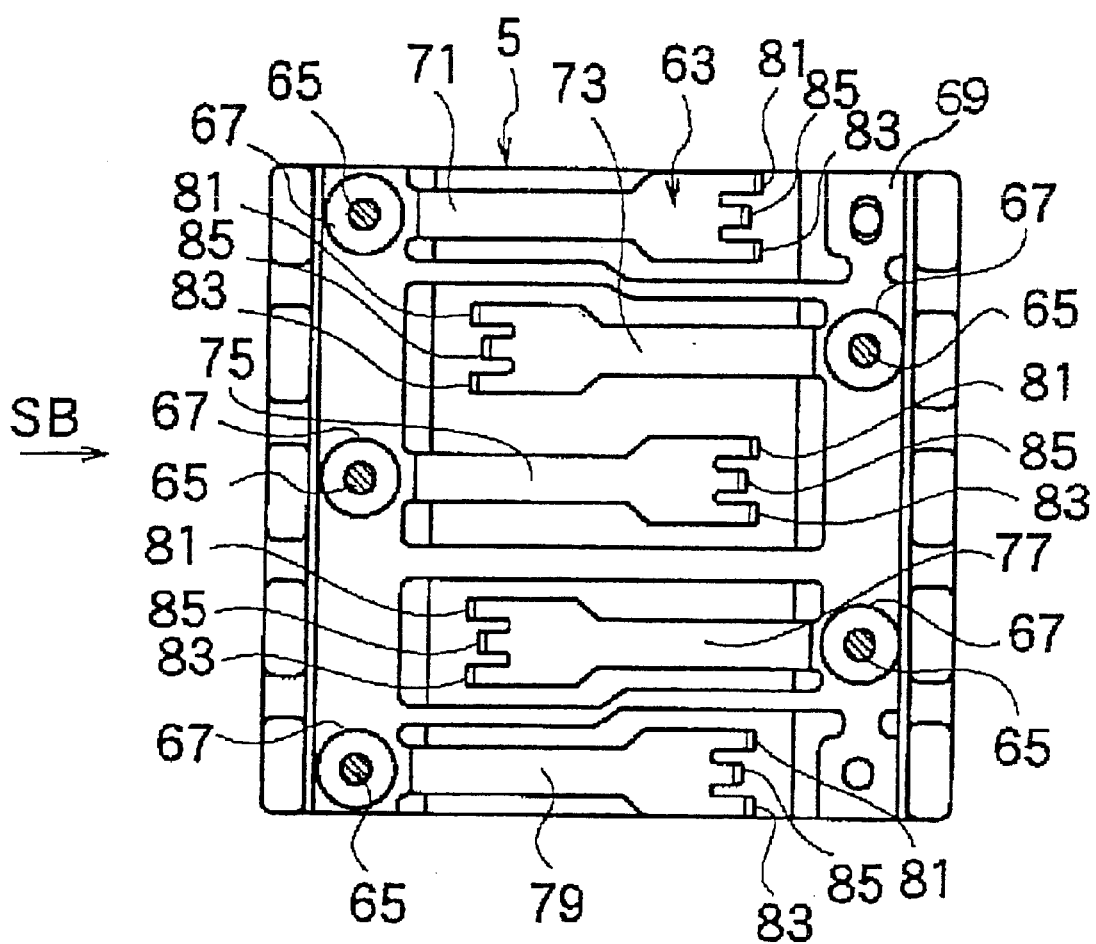
FIG. 3 is a front view of a moving disk according to the embodiment.
Figure 4:
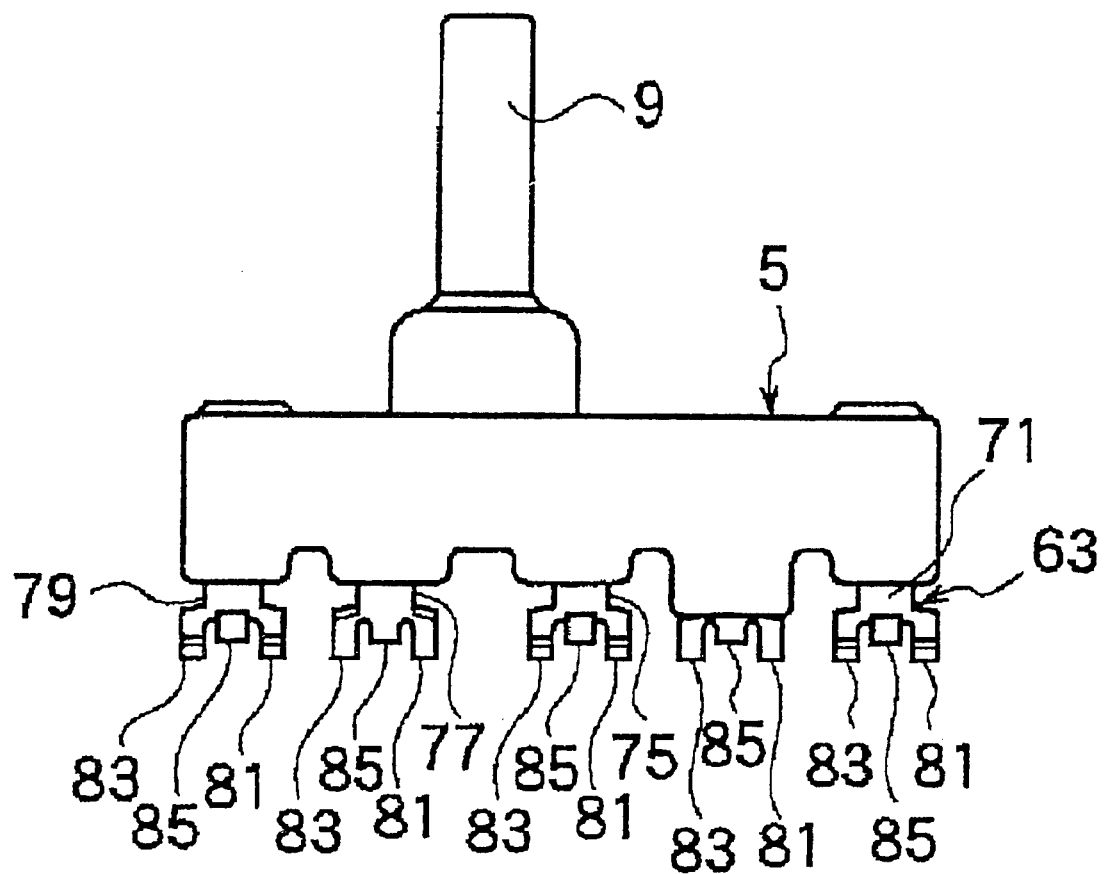
FIG. 4 is a side view of the moving disk viewing FIG. 3 from an SB direction according to the embodiment.

The moving disk 5 is as shown by FIG. 3 and FIG. 4. FIG. 3 is a front view of the moving disk 5 and FIG. 4 is a side view in an arrow mark SB direction of FIG. 3. That is, the moving disk 5 is formed by resin and a moving contact 63 formed by metal such as stainless steel is fixed to a face of the moving disk 5 on a side opposed to the pole disk 3. The moving contact 63 is fixed by, for example, calking a fixing metal piece 67 to a coupling pin 65 projected from the moving disk 5.

Figure 5:
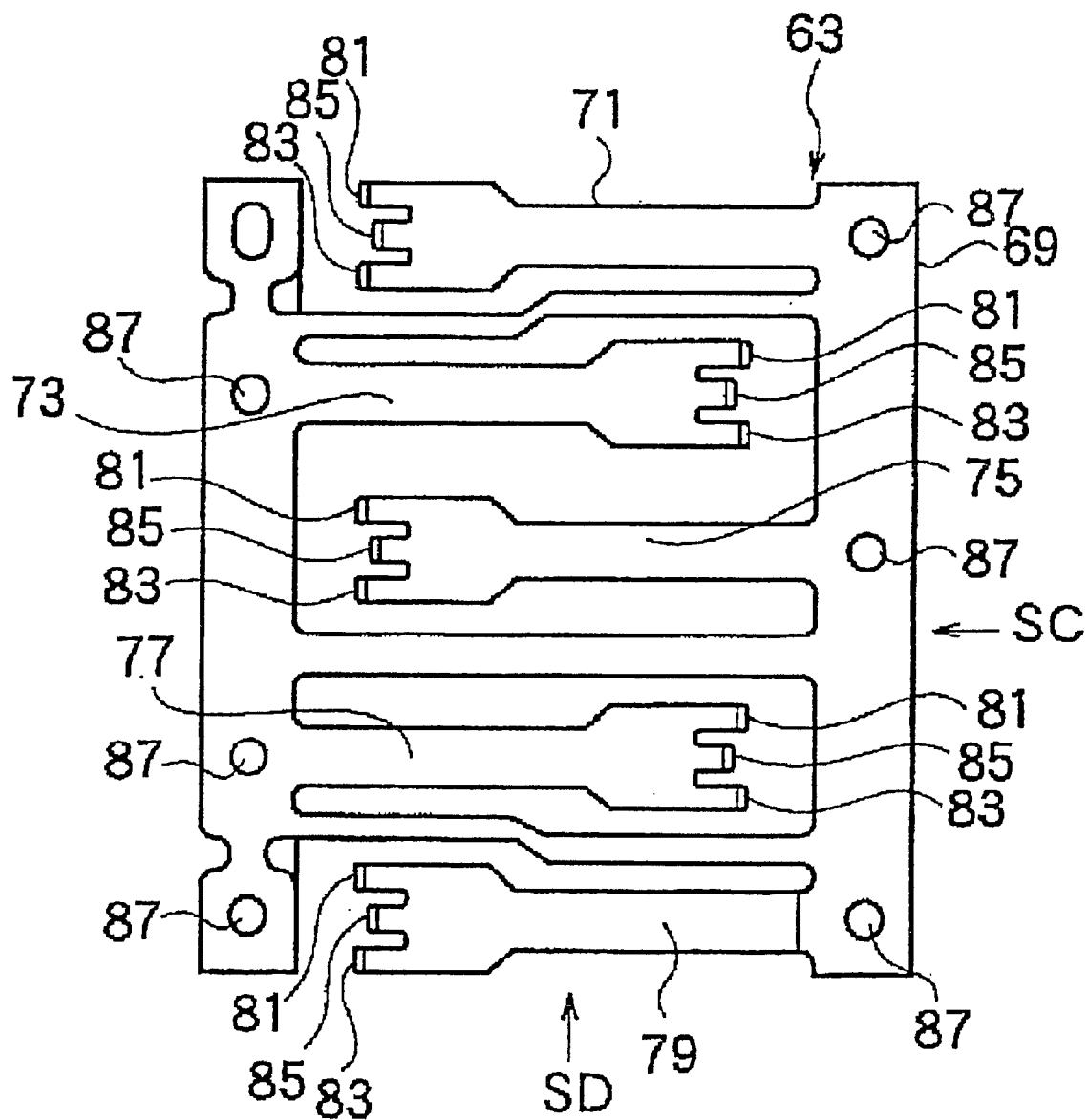
FIG. 5 is a bottom view viewing a moving contact from a side of the moving disk according to the embodiment.
Figure 6:
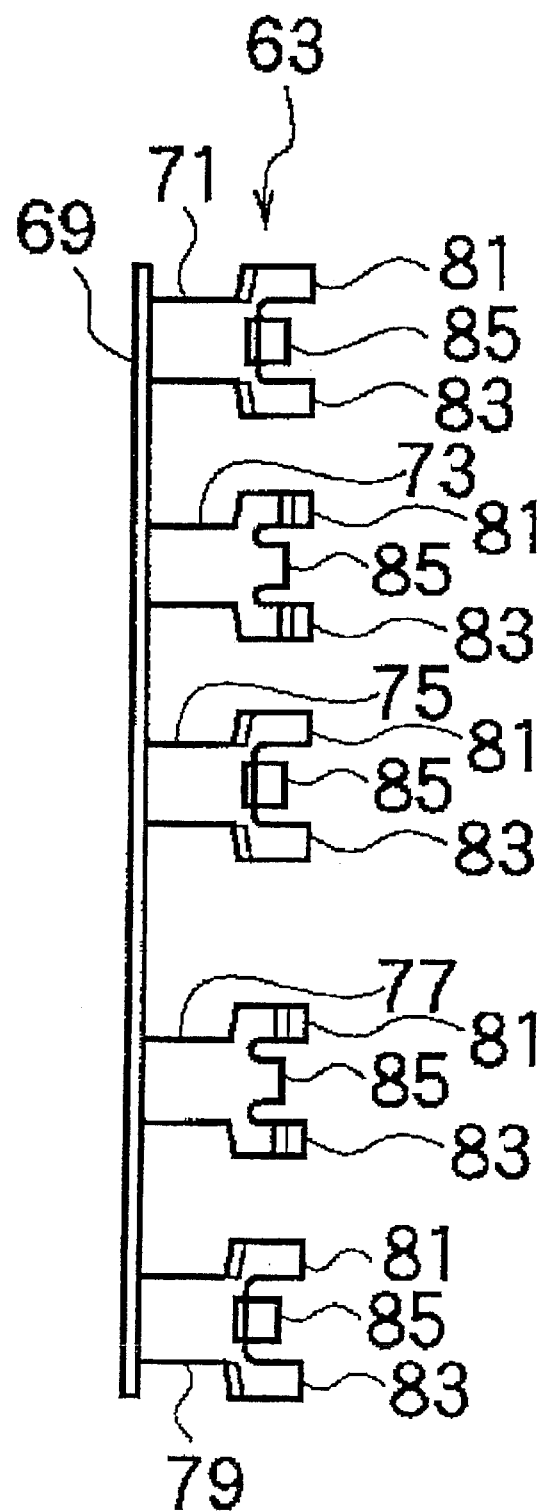
FIG. 6 is a side view viewing FIG. 5 in an SC direction according to the embodiment.
Figure 7:
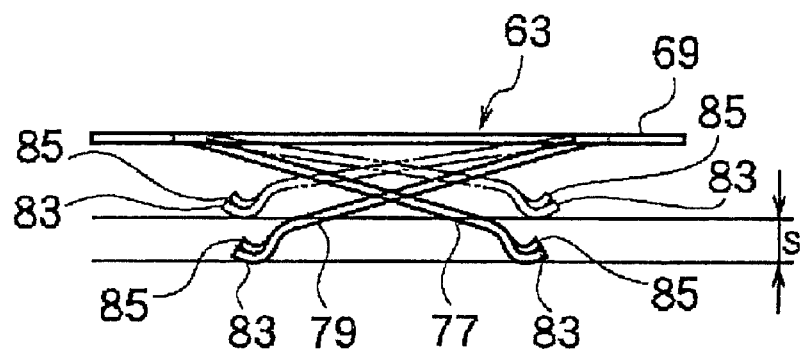
FIG. 7 is a side view viewing FIG. 5 in an SD direction according to the embodiment.

The moving contact 63 is constituted as shown by FIG. 5, FIG. 6 and FIG. 7. FIG. 5 is a rear view viewing the moving contact 63 from a side of the moving disk 5 (rear face side in direction orthogonal to paper face of FIG. 3) in a state of FIG. 3, FIG. 6 is a view viewing FIG. 5 in an arrow mark SC direction and FIG. 7 is a view viewing FIG. 5 in an arrow mark SD direction. As shown by FIG. 5, FIG. 6 and FIG. 7, the moving contact 63 is provided with contact arms 71, 73, 75, 77 and 79 in a cantilever shape relative to a fixed portion 69 in a frame-like shape. Further, as shown by FIG. 5, front ends of the contact arms 71, 75 and 79 and the contact arms 73 and 77 are not disposed respectively on the same straight lines and a so-to-speak W type arrangement is constituted.

The respective contact arms 71, 73, 75, 77 and 79 are arranged to incline as shown by FIG. 7 and front ends thereof are respectively provided with pairs of contact portions 81 and 83 in a cantilever shape. The respective contact portions 81 and 83 are formed to bend. The respective contact portions 81 and 83 of the respective contact arms 71, 73, 75, 77 and 79 are respectively brought into contact with the fixed contacts S2, VB, S4, S1 and S3 of FIG. 2 and the respective contact arms 71, 73, 75, 77 and 79 are bent by S from free states thereof as shown by FIG. 7 and brought into elastic contact with the fixed contacts S2, VB, S4, S1 and S3 to thereby maintain constant contact pressure.

There are provided ride-on portions 85 between the contact portions 81 and 83 of the respective contact arms 71, 73, 75, 77 and 79. The ride-on portions 85 are shorter than a the respective contact portions 81 and 83 and are formed at the respective contact arms 71, 73, 75, 77 and 79 in a cantilever shape. The respective ride-on portions 85 are also formed to bend.

Further, according to the embodiment, the ride-on portion 85 is provided also to the contact arm 73 provided with the contact portions 81 and 83 in contact with the fixed contact VB in the always conducted state. Therefore, even when the fixed contact VB in the always conducted state is arranged to change from the groove 17 to any of the grooves 15, 19, 21 and 23 by design change, the moving contact 63 can be used as it is without design change. However, the contact arm 73 in correspondence with the fixed contact VB in the always conducted state, does not need the ride-on portion 85 and therefore, there can also be constructed in a constitution omitting the ride-on portion 85.

The fixed portion 69 is provided with holes 87 for penetrating the coupling pins 65 of FIG. 3.

Next, a further explanation will be given of relationships among the moving contact, the fixed contacts and the insulator portions constituting essential portions of the embodiment of the invention as follows.

Figure 8:
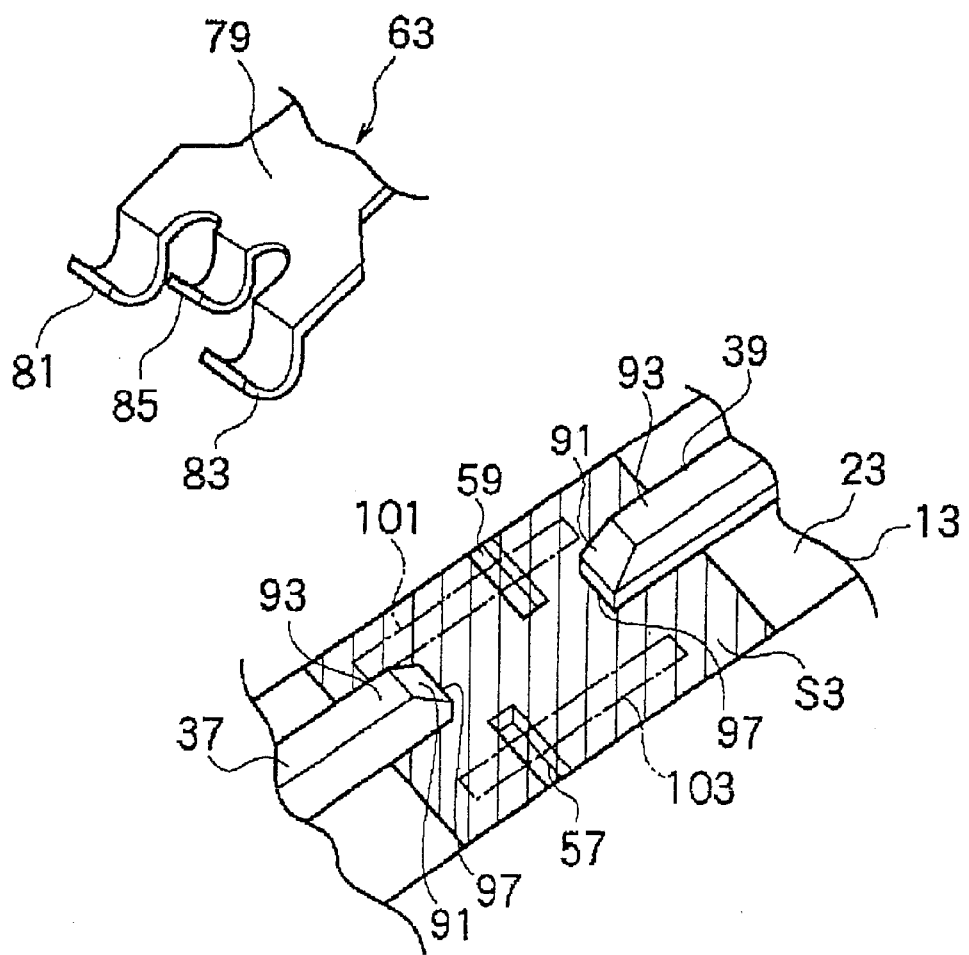
FIG. 8 is a perspective view of a disassembled state showing a relationship among a contact arm, a fixed contact and an insulator portion according to the embodiment.

The relationships among the movable contact 63, the fixed contacts S2, S4, S1 and S3 and the insulator portions 25, 27, 29, 31, 33, 35, 37 and 39, are substantially the same in the respective fixed contacts S2, S4, S1 and S3 and accordingly, an explanation thereof will be given by taking out the portion of the fixed contact S3 as shown by FIG. 8. Additionally, with regard to the relationships among the other fixed contacts S2, S4 and S1, the movable contact 63 and the insulator portions 25, 27, 29, 31, 33 and 35, an explanation thereof will be omitted.

Figure 9:
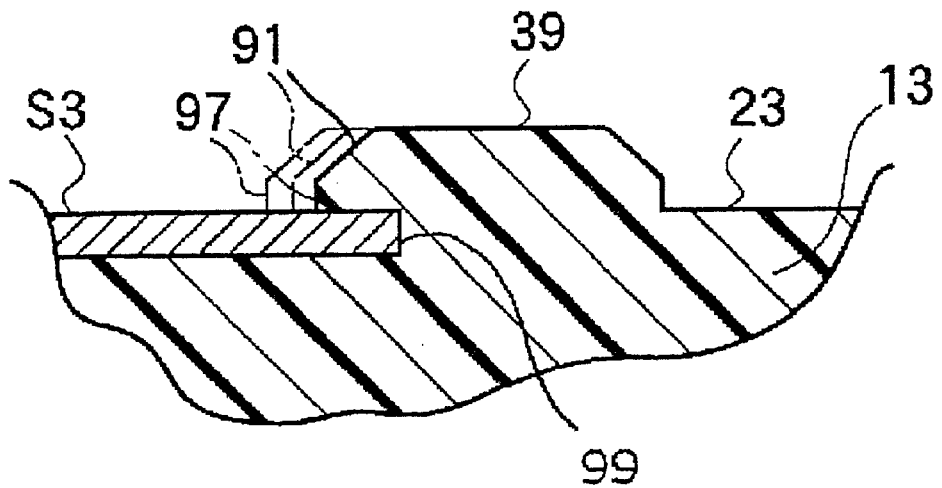
FIG. 9 is an enlarged sectional view at a periphery of the insulator portion.

FIG. 8 shows the relationship among the fixed contact S3, the insulator portions 37 and 39 and the contact arm 79 of the moving contact 63 by disassembling them in a perspective view. In the state of FIG. 8, FIG. 9 shows a sectional view at portions of the fixed contact S3 and the insulator portion 39 and FIG. 10 and FIG. 11 show sectional views enlarging an operational relationship among the fixed contact S3, the insulator portion 39 and the contact arm 79.

Figure 10:
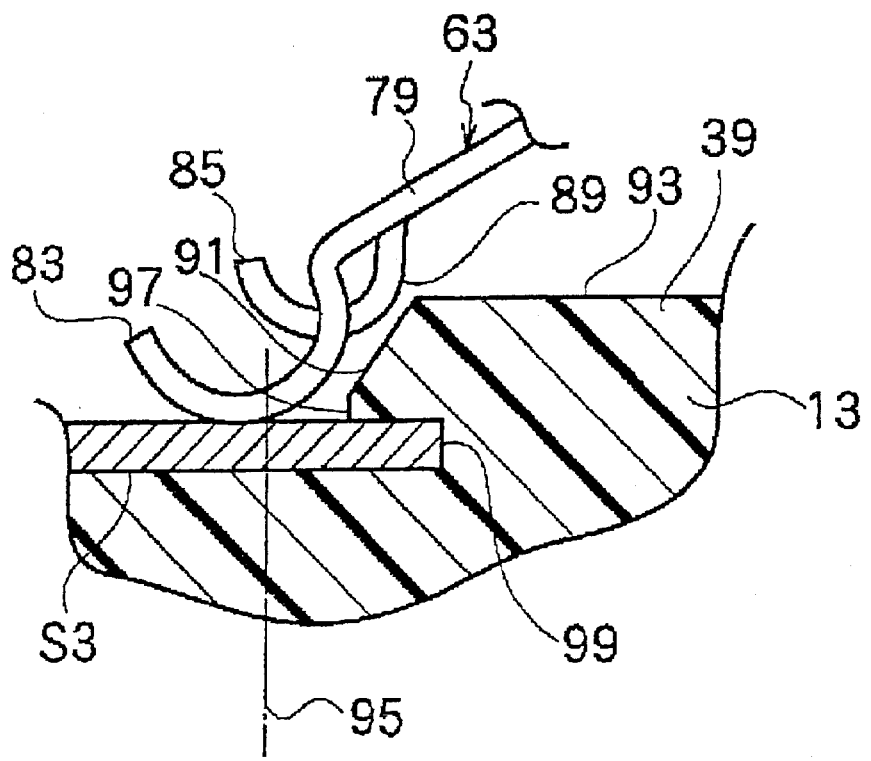
FIG. 10 is an enlarged sectional view showing a relationship between the insulator portion and the contact arm.
Figure 11:
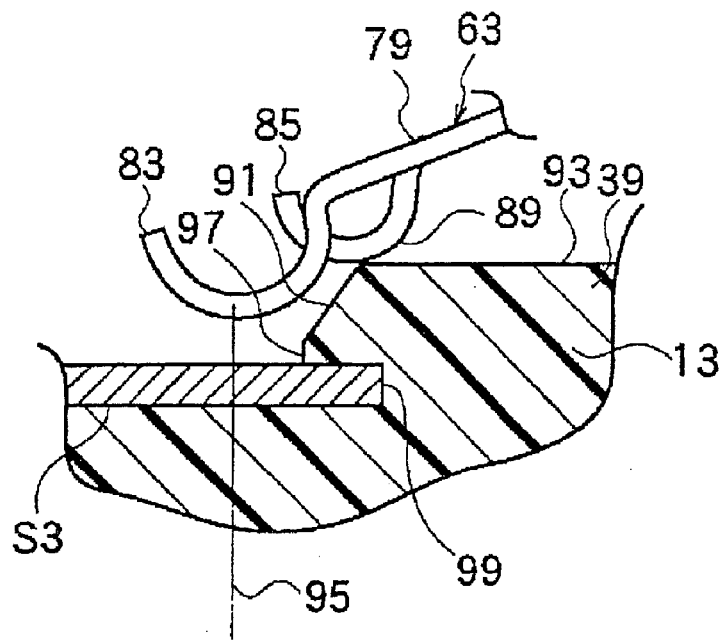
FIG. 11 is an enlarged sectional view of a state in which the contact arm rides on the insulator portion according to the embodiment.

First, as shown by FIG. 8, FIG. 10 and FIG. 11, the ride-on portion 85 of the moving contact 63 is provided with a rounded portion 89 for riding on by forming to bend the ride-on portion 85 as described above. Meanwhile, the insulator portion 39 is provided with sliding faces 91 and 93 for making the rounded portion 89 of the ride-on portion 85 ride thereon and guiding the rounded portion 89. The sliding face 91 is set with a constant inclination angle and the sliding face 93 is set substantially in parallel with the sliding direction of the contact arm 79 of the moving contact.

The inclination angle of the sliding face 91 determines steepness of ON/OFF of the moving contact 63 with respect to the fixed contact S3 and operational force of the moving disk 5. When the inclination of the sliding face 91 is steep, the operational force is increased, however, the ON/OFF operation of the moving contact 63 with respect to the fixed contact S3 can be carried out steeply. When the inclination angle of the sliding face 91 becomes gradual, the operational force of the moving disk 5 is reduced, however, the steepness of ON/OFF of the moving contact 63 with respect to the fixed contact S3 is alleviated. Therefore, the inclination of the sliding face 91 is determined in consideration of the operational force of the moving disk 5 and the steepness of ON/OFF.

A height of the sliding face 93 in parallel with the sliding direction relative to the fixed contact S3, determines a size of a gap between the contact portion 83 and the fixed contact S3 when the moving contact 63 rides on the insulator portion 39. When the height of the insulator portion 39 relative to the fixed contact S3 is large, although an amount of bending the contact arm 79 is increased, the gap between the contact portion 83 and the fixed contact S3 is increased and accordingly, a contact OFF state can firmly be formed. Therefore, the height of the sliding face 93 is determined in consideration of the amount of bending the contact arm 79 and the gap of the contact portion 83 relative to the fixed contact S3.

Figure 19:
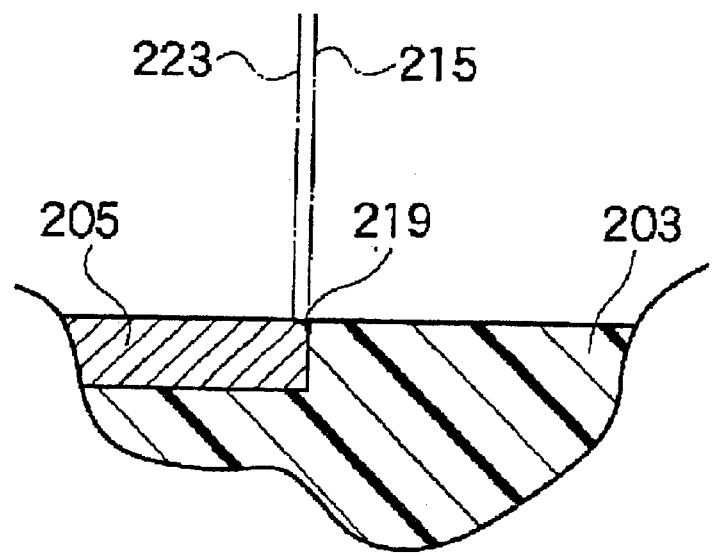
FIG. 19A is a sectional view showing a shift of the ON/OFF switch position by droop of the fixed contact.
FIG. 19B is a sectional view showing the shift of the ON/OFF switch position by burr of the fixed contact according to the conventional example.
Figure 19:
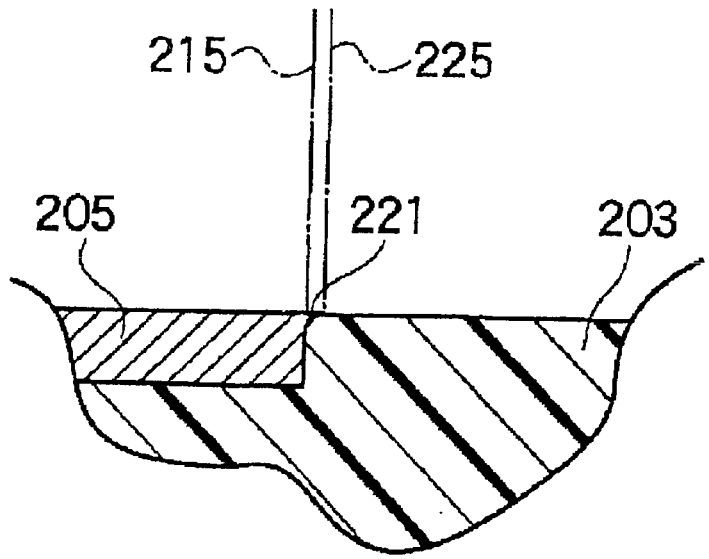

As shown by FIG. 8 through FIG. 11, a reference face 97 in view of fabrication is provided at an end portion of the sliding face 91. An end portion 99 of the fixed contact S3 is brought into a state of entering a lower portion side of the insulator portion 39 relative to the reference face 97. Therefore, an ON/OFF switch position 95 of the fixed contact S3 shown in FIG. 10 and FIG. 11, is set with the reference face 97 as a reference and the end portion 99 of the fixed contact S3 does not relate to the ON/OFF switch position 95. Therefore, even when droop or burr is caused at the end portion of the fixed contact S3 as shown by FIG. 19, the ON/OFF switch position 95 can accurately be set.

In this way, as illustrated in FIG. 9 by chained lines, in setting the ON/OFF switch position 95 of the fixed contact S3, the ON/OFF switch position 95 can be matched only by machining a die on the side of the pole disk 3 by electric discharge machining in order to determine the reference face 97 and therefore, it is not necessary to adjust a die on the side of the fixed contact S3 and accuracy formation is extremely facilitated. The reference face 97 also constitutes a reference of setting the position and the inclination angle of the sliding face 91. That is, by electric discharge machining of dies, as illustrated by FIG. 9 by one-dotted chain lines and bold lines, the reference face 97 and the sliding face 91 can be set.

When the moving disk 5 is moved, the contact portions 81 and 83 of the moving contact arm 79 in the moving contact 63, are slidingly moved as shown by FIG. 10 in ranges 101 and 103 of FIG. 8 relative to the fixed contact S3. By sliding movement of the contact portions 81 and 83 relative to the fixed contact S3, when the contact portions 81 and 83 come to the ON/OFF switch position 95 of the fixed contact S3, the ride-on portion 89 is brought into contact with the sliding face 91 to thereby start sliding to ride on the sliding face 91 and contact of the contact portions 81 and 83 to the fixed contact S3 becomes non-contact at the ON/OFF switch position 95. Successively, the ride-on portion 85 slidingly moves on the sliding face 91 and is moved to ride over the side of the sliding face 93 in parallel with the sliding direction as shown by FIG. 11. When the ride-on portion 85 rides on the side of the sliding face 93, the gap between the contact portions 81 and 83 and the fixed contact S3 becomes a set value and a non-contact state between the contact portions 81 and 83 and the fixed contact S3 can firmly be formed.

Conversely, when the ride-on portion 85 comes down from the insulator portion 39 from the sliding face 93 via the sliding face 91 by moving the moving disk 5, the contact portions 81 and 83 of the contact arm 79 in the moving contact 63 are brought into contact with the fixed contact S3. The contact is firmly carried out at the ON/OFF switch position 95 of the fixed contact S3 by the relationship between the ride-on portion 85 and the sliding face 91. According to the embodiment, the pair, that is, at least two pieces of the contact portions 81 and 83 in the cantilever shape are provided and therefore, when the contact arm 79 comes down from the insulator portion 39, even when a foreign object is interposed between one of the contact portions 81 and 83 and the fixed contact S3, other of the contact portions 83 and 81 can necessarily be brought into contact therewith and the contact of the contact arm 79 to the fixed contact S3 can firmly be carried out.

Figure 18:
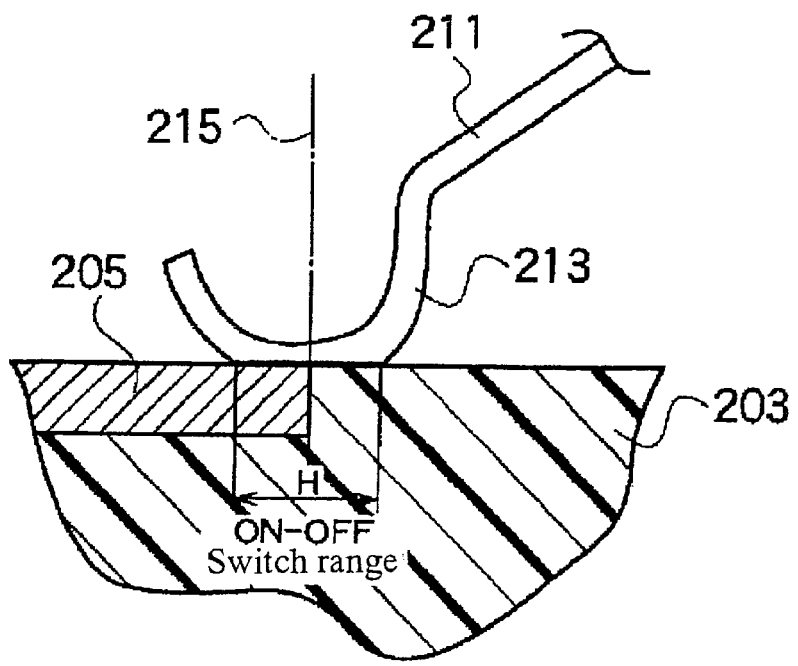
FIG. 18 is a sectional view showing a worn state of the moving contact according to the conventional example.

In this way, by operation of the ride-on portion 85 and the insulator portion 39, by moving the moving disk 5, contact/non-contact of the contact portions 81 and 83 of the contact arm 79 in the moving contact 63 with respect to the fixed contact S3, can firmly be carried out at the ON/OFF switch position 95 of the fixed contact S3 and ON/OFF of the contact can accurately be carried out. Further, even when the contact portions 81 and 83 of the contact arm 79 in the moving contact 63 are slidingly moved relative to the fixed contact S3 and are ageingly worn and contact of the contact portions 81 and 83 with respect to the fixed contact S3 is spread from line contact to face contact as shown by FIG. 18, the spread of the contact range does not influence the ON/OFF switch position. The ON/OFF switch position is determined finally by the relationship between the ride-on portion 85 and the sliding faces 91 and 93 and therefore, regardless of wear of the contact portions 81 and 83, contact/non-contact of the moving contact 63 with respect to the fixed contact S3 can be carried out accurately at the ON/OFF switch position 95.

Particularly, when the inhibitor switch is used in a transmission case and high temperature oil is scattered and splashed on the inhibitor switch, there is also a concern that worn powder or the like is interposed between the contact portions 81 and 83 of the contact arm 79 in the movable contact 63 and the fixed contact S3 and wear of the contact portions 81 and 83 is progressed at an early stage. However, as described above, wear of the contact portions 81 and 83 does not directly influence on the ON/OFF switch position and accordingly, there can be provided the inhibitor switch 1 capable of maintaining accurate ON/OFF switch for a long period of time and having high durability.

Further, according to the embodiment, the rounded portion 89 is made to slidingly move on the sliding faces 91 and 93 while being in line contact with the sliding faces 91 93 and therefore, the ride-on portion 85 does not slide at one location of the insulator portion 39 but slides longly over the sliding faces 91 and 93. Accordingly, wear of the sliding faces 91 and 93 can significantly be restrained. Therefore, shapes of the sliding faces 91 and 93 can be maintained for a long period of time and the ON/OFF switch position 95 of the fixed contact S3 can be maintained for a long period of time accurately even in this respect.

Further, a similar operation is also carried out between the fixed contact S2 and the insulator portion 25, and the contact portions 81 and 83 and the ride-on portion 85 of the contact arm 71 in the moving contact 63, between the fixed contact S4 and the insulator portions 27, 29 and 31, and the contact portions 81 and 83 and the ride-on portion 85 of the contact arm 75 in the moving contact 63, and between the fixed contact S1 and the insulator portions 33 and 35 and the contact portions 81 and 83 and the ride on portion 85 of the contact arm 77 in the moving contact 63. Therefore, according to the inhibitor switch 3, as a whole, ON/OFF between the moving contact 63 and the fixed contacts S2, S4, S1 and S3, can accurately be carried out regardless of wear of the moving contacts 63 and the accuracy can be maintained for a long period of time.

In this way, according to the inhibitor switch of the embodiment, an amount of change in the ON/OFF switch position after a long period of time of use, is significantly reduced. Further, shift of the ON/OFF switch position is determined by wear of the insulator portion 39 or the like and therefore, there is known a direction of shift of the ON/OFF switch position after a long period of time of use and an initial control value or the like of the sliding face 91 is easy to determine.

Figure 12:
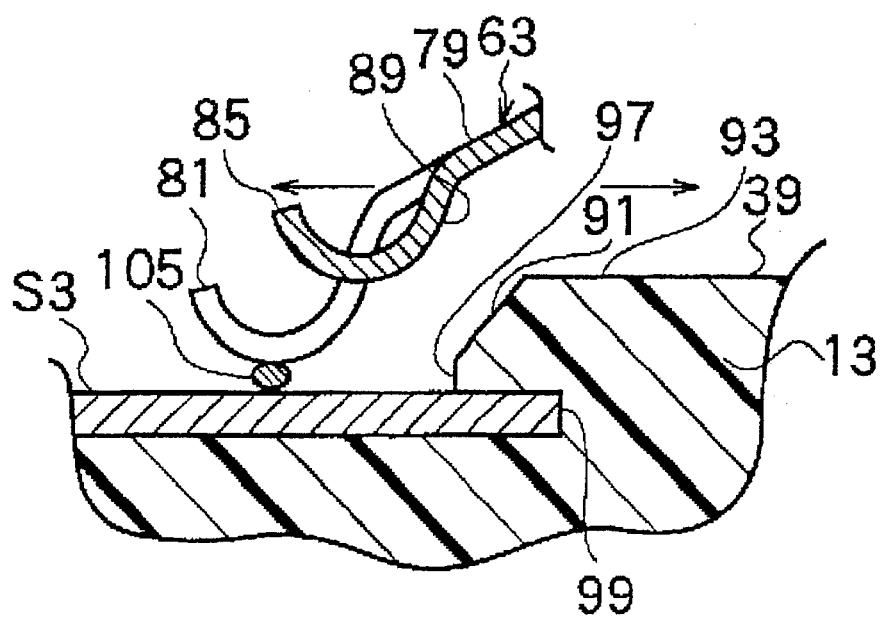
FIG. 12 is a sectional view when a foreign object is interposed between a contact portion and the fixed contact.

Meanwhile, when the contact arm 79 of the moving contact 63 or the like comes down from the insulator portion 39 or the like, as shown by FIG. 12, an insulating foreign object 105 may be interposed between the contact portion 81 or 83 and the fixed contact S3. Particularly, in the case of the inhibitor switch 1 used in a transmission case, there is a high possibility of mixing the foreign object 105 in scattered oil and there is a high possibility of interposing the insulating foreign object 105 between the contact portion 81 or 83 and the fixed contact S3. Also in this case, by providing a pair of or at least two pieces of the contact portions 81 and 83, there is an extremely low possibility of simultaneously interposing the foreign objects 105 between both of the contact portions 81 and 83 and the fixed contact S3 and one of the contact portions 81 and 83 can firmly be brought into contact with the fixed contact S3.

However, it is not preferable to make the foreign object 105 remain interposed between the contact portion 81 or 83 and the fixed contact S3 as it is. Hence, there are provided the discharge portions 41, 43, 45, 47, 49, 51, 53, 55, 57, 59 and 61 as described above. The discharge portions 41, 43, 45, 47, 49, 51, 53, 55, 57, 59 and 61 are constructed by similar constitutions.

Hence, an explanation will be given of the discharge portion 59 at a position similar to that in FIG. 10 and FIG. 11 and an explanation of other discharge portion 41 and the like will be omitted.

Figure 13:
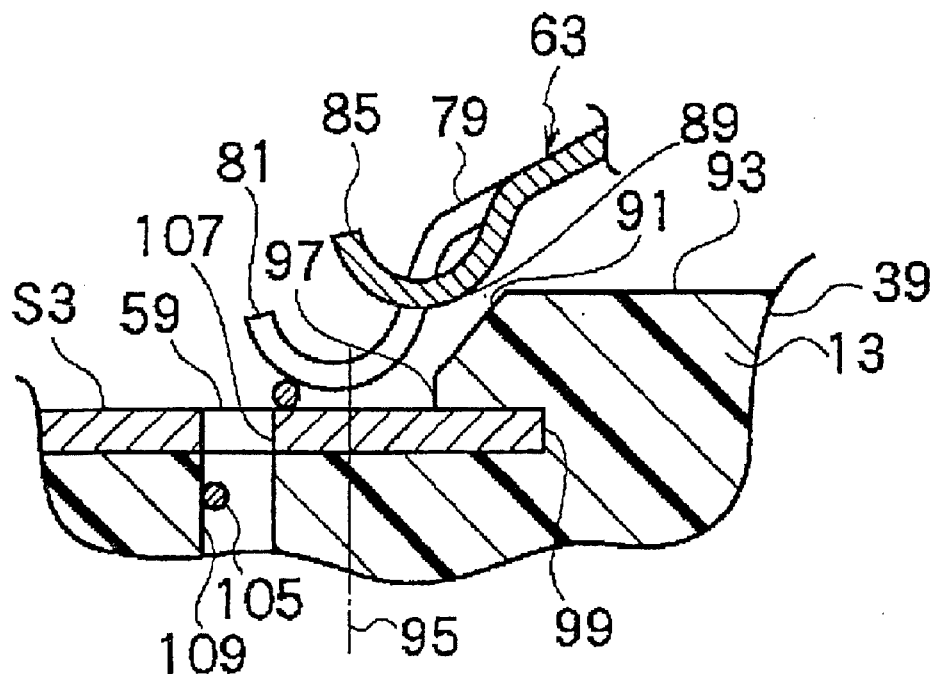
FIG. 13 is a sectional view when the foreign object is interposed between the contact portion and the fixed contact according to the embodiment.
Figure 14:
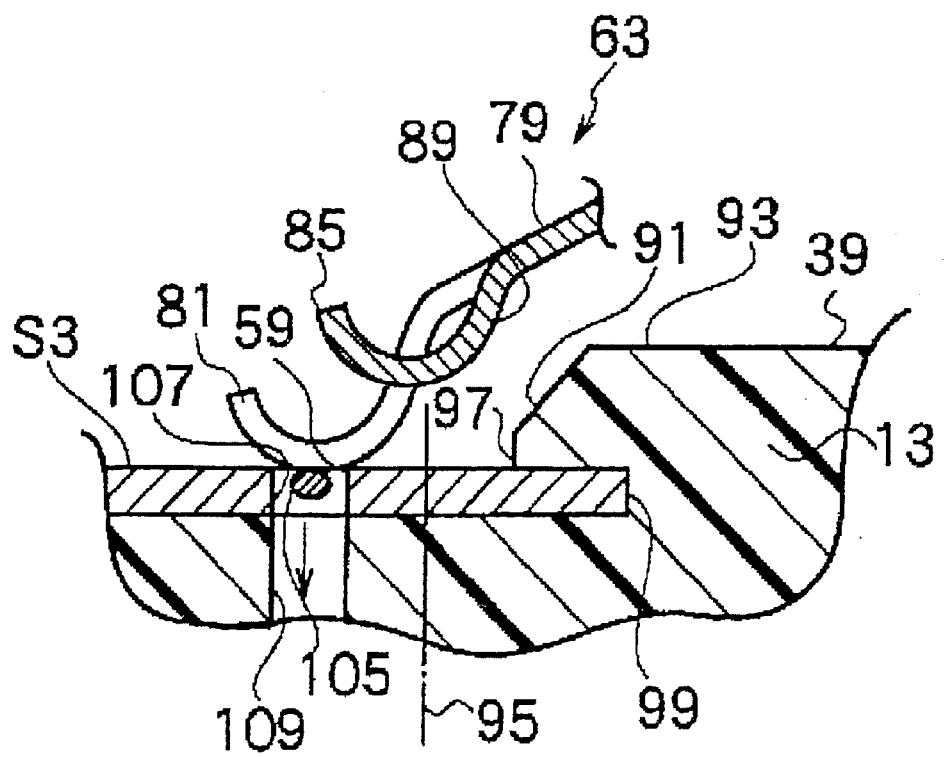
FIG. 14 is a sectional view showing a state of discharging the foreign object according to the embodiment.
Figure 16:
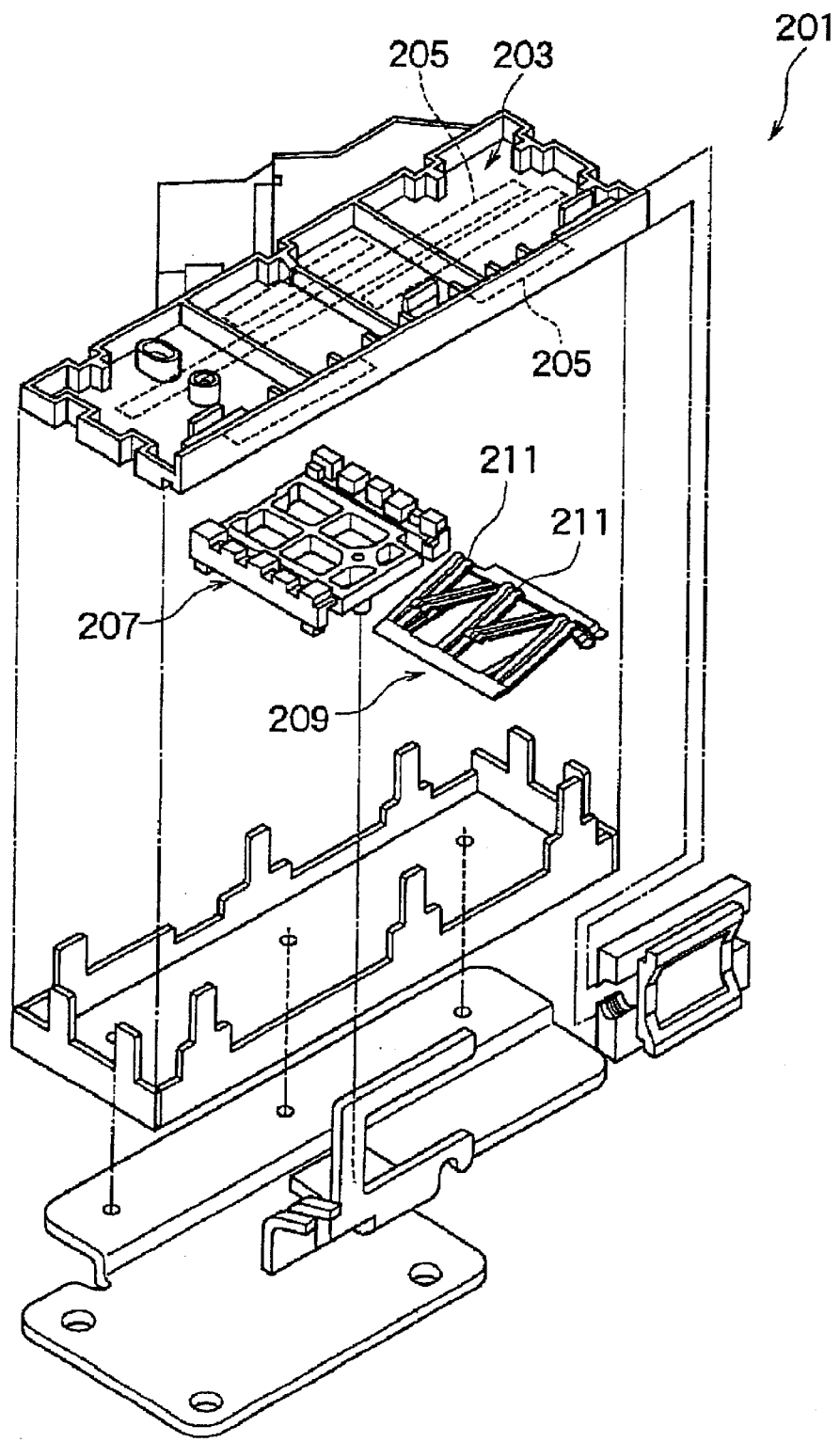
FIG. 16 is a disassembled perspective view of an inhibitor switch according to a conventional example.
Figure 17:
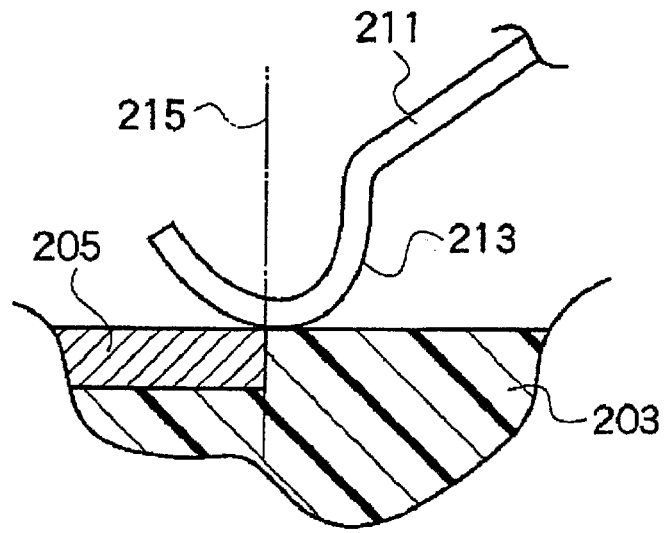
FIG. 17 is a sectional view showing a relationship between an ON/OFF switch position of a fixed contact and a moving contact according to the conventional example.

As shown by FIG. 8, FIG. 13 and FIG. 14, the discharge portion 59 discharges the foreign object 105 from a discharge port 107 provided at the fixed contact S3. The discharge port 107 is formed in a rectangular shape to cross the range 101 or 103 in which the contact portion 81 or 83 of the contact arm 79 in the moving contact 63, is slidingly moved on the fixed contact S3. The discharge port 107 communicates with a through hole 109 of the base disk 13. The through hole 109 is opened at a face on an opposed side of the base disk 13 and can discharge the foreign object 105 from the through hole 109 to outside of the base disk 13. However, the discharge portion 59 can also be formed only by the discharge port 107 or a more or less recessed portion formed on the side of the discharge port 107 and the base disk 13. In this case, by setting to incline the discharge port 107 or the like to a lower side in an up and down direction of FIG. 1, the foreign object 105 put into the discharge port 107 can naturally be flowed out in an inclined lower direction.

Further, when the contact arm 79 of the moving contact 63 comes down from the insulator portion 39, even in the case in which the foreign object 105 is interposed between the contact portion 81 or the contact portion 83 and the fixed contact S3, when the contact portion 81 or the contact portion 83 is slidingly moved relative to the fixed contact S3 and passes above the discharge port 107, the foreign object 105 is scraped into the discharge portion 107 and is discharged on the opposed side of the base disk 13 via the through hole 109.

Further, the foreign object 105 is no longer interposed between the contact portion 81 or the contact portion 83 of the contact arm 79 in the moving contact 63 and the fixed contact S3 and firm contact can be carried out.

Further, according to the embodiment, the pair of contact portions 81 and 83 are provided and therefore, when the contact arm 79 comes down from the insulator portion 39, for example, even when the foreign object 105 is interposed between the contact portion 83 on one side and the fixed contact S3, the contact portion 81 on the other side and the fixed contact S3 can be conducted and the ON state of the contact arm 79 and the fixed contact S3 can firmly be produced.

Further, the discharge portions 57 and 59 are arranged at positions shifted to each other in the sliding direction of the moving contact 63 and therefore, even when the contact portion 81 on one side passes above the discharge port 107 and thereafter, the foreign object 105 is interposed between the contact portion 83 on the other side and the fixed contact S3, and contact between the contact portion 81 and the fixed contact S3 can be maintained. In this way, contact of at least one of the contact portions 81 and 83 can be maintained and the firm ON state can be produced.

Further, the discharge portion 59 or the like is installed at a vicinity of the ON/OFF switch position 95 of the fixed contact S3 and therefore, immediately after the contact arm 79 comes downs from the insulator portion 39, the contact portion 81 can pass above the discharge port 107 and the foreign object 105 can immediately be discharged. Therefore, the firm ON state can be produced and contact failure by the foreign object 105 can firmly be restrained also in this respect.

Further, the foreign object 105 invading inside of the inhibitor switch 1 is flowed to outside of the switch and therefore, contact environment can significantly be promoted.

According to the embodiment, foreign objects, oxides or the like adhered to the contact portions 81 and 83 can be removed by the discharge port 107 and further, the contact portions 81 and 83 are polished and accordingly, a new contact face can always be maintained. Therefore, a stable contact state can be maintained for a long period of time also in this respect.

Figure 15:
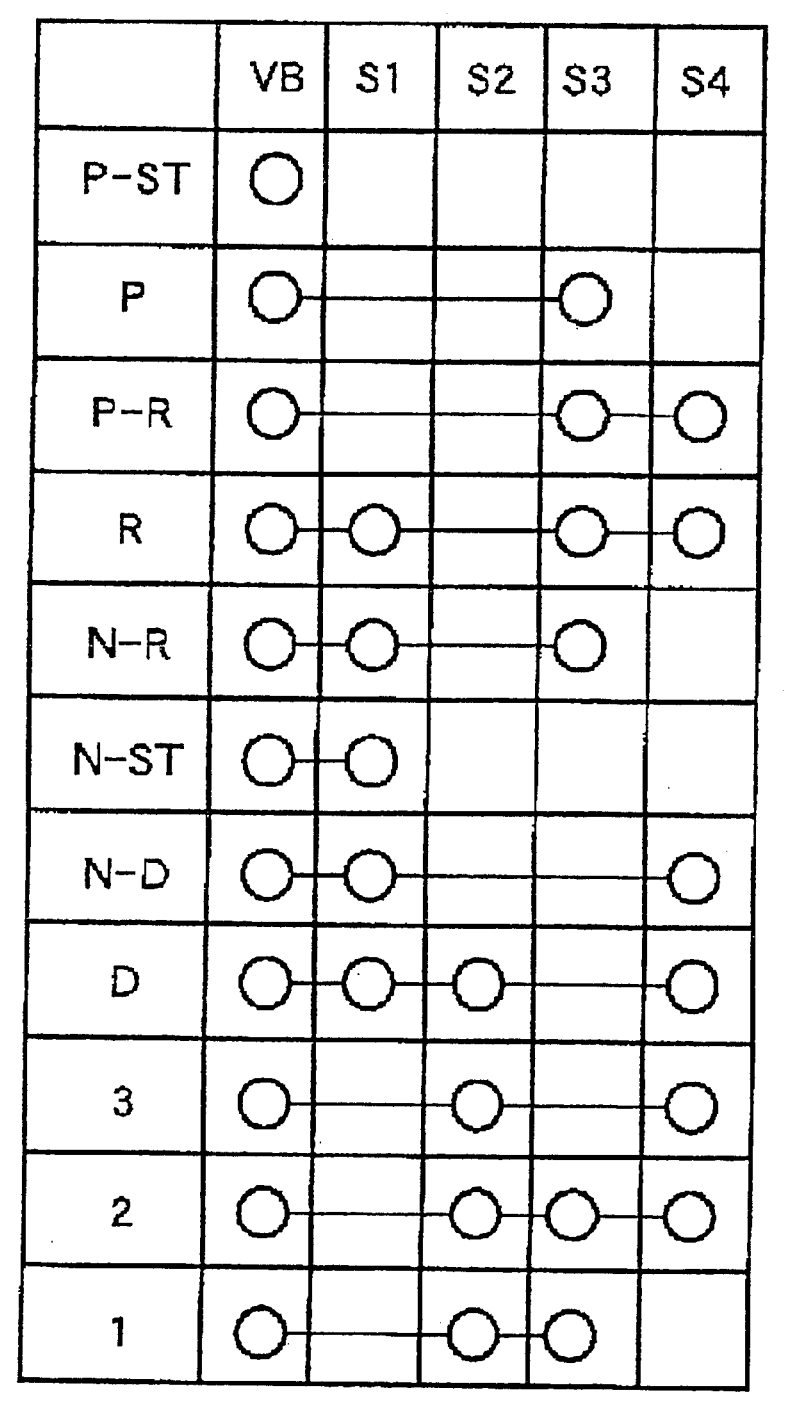

FIG. 15 is a diagram showing a relationship between conductive states of the fixed contacts VB, S1, S2, S3 and S4 and states of detecting speed change positions. In the diagram of FIG. 15, circled portions designate conducted portions. By combinations of conduction of the fixed contacts VB, S1, S2, S3 and S4, there can be accurately detected a parking range P, a reverse range R, a neutral range N, a drive range D, third speed 3, second speed 2 and first speed 1 constituting the speed change positions.

Further, although according to the above-described embodiment, the discharge portions 41 and the like are provided, these can also be omitted. Further, although the rounded portion 89 of the ride-on portion 85 is constituted by bending the ride-on portion 85 as a whole, only a portion thereof in contact with the sliding face 91 or 93 can also be constituted as a rounded portion. Further, although the ride-on portion 85 is constituted as a member separate from the contact portion 81 or 83, one of the pair of contact portions 81 and 83 can commonly be used as a ride-on portion without separately providing the ride-on portion 85.

What is claimed is:

1. An inhibitor switch comprising a pole disk having a fixed contact and a moving disk having a moving contact slidable relative to the fixed contact and movable relative to the pole disk, said inhibitor switch being arranged in a transmission case of an automatic transmission, with a speed change position of the automatic transmission being detected by the moving contact and the fixed contact, wherein:

the pole disk is projected with an insulator portion formed by an insulating member in correspondence with an ON/OFF switch position of the fixed contact constituting a boundary of contact and non-contact by sliding movement of the moving contact relative to the fixed contact;

the moving contact includes a ride-on portion capable of riding on the insulator portion; and when the moving contact is slidingly moved relative to the fixed contact and the moving contact is disposed at the ON/OFF switch position of the fixed contact, the ride-on portion rides on the insulator portion, the moving contact is separated from and brought into non-contact with the fixed contact and when the ride-on portion comes down from the insulator portion, the moving contact is brought into contact with the ON/OFF switch position of the fixed contact.

2. The inhibitor switch according to claim 1, wherein the ride-on portion of the moving contact includes a rounded portion for riding on; and the insulator portion includes a sliding face for making the rounded portion of the ride-on portion ride thereon and guiding the rounded portion.

3. The inhibitor switch according to claim 1 or 2, wherein the moving contact includes a pair of contact portions in a cantilever shape simultaneously brought into elastic contact with the fixed contact; and the ride-on portion is arranged between the two contact portions and formed in a cantilever shape shorter than the contact portions.

4. The inhibitor switch according to claim 1 or 2, wherein the moving contact includes a plurality of contact portions simultaneously brought into elastic contact with the fixed contact; and the fixed contact includes discharge portions for discharging a foreign object interposed between the two contacts from discharge ports provided at the fixed contact respectively in correspondence with the contact portions of the moving contact.

5. The inhibitor switch according to claim 4, wherein the respective discharge portions in correspondence with the respective contact portions are arranged at positions shifted from each other in a sliding direction of the movable contact.

6. The inhibitor switch according to claim 4, wherein the discharge portions are provided at vicinities of the ON/OFF switch position of the fixed contact.

7. The inhibitor switch according to claim 4, wherein the discharge port communicates with a through hole of the base disk.

8. The inhibitor switch according to claim 5, wherein the discharge portions are provided at vicinities of the ON/OFF switch position of the fixed contact.

9. The inhibitor switch according to claim 5, wherein the discharge port communicates with a through hole of the base disk.

10. The inhibitor switch according to claim 6, wherein the discharge port communicates with a through hole of the base disk.

* * * * *